United States Patent [19]
Zizola

[11] Patent Number: 5,394,911
[45] Date of Patent: Mar. 7, 1995

[54] AUTOMATIC DISPENSER FOR DOUGHY FOOD PRODUCTS

[75] Inventor: Corrado Zizola, Treviso, Italy

[73] Assignee: Fadis S.R.L., Italy

[21] Appl. No.: 934,744

[22] Filed: Oct. 9, 1992

[30] Foreign Application Priority Data

Apr. 9, 1990 [IT] Italy ................................. 45720/90

[51] Int. Cl.⁶ ............................................. A47F 1/04
[52] U.S. Cl. ..................................... 141/270; 99/494; 426/393; 141/174; 141/183; 141/104; 141/89; 141/90; 141/91
[58] Field of Search ............... 141/82, 129, 130, 168, 141/174, 183, 187, 103, 104, 105, 89-92; 426/393; 99/494, 357; 141/90

[56] References Cited

U.S. PATENT DOCUMENTS

| | | |
|---|---|---|
| 2,524,673 | 10/1950 | Martin . |
| 2,728,306 | 12/1955 | Tarr . |
| 3,000,408 | 9/1961 | Vischer, Jr. ............... 141/174 |
| 3,003,437 | 10/1961 | Taylor et al. . |
| 3,590,750 | 6/1971 | Lamy . |
| 3,838,791 | 10/1974 | Raitt . |
| 3,876,110 | 4/1975 | Logie . |
| 4,009,740 | 3/1977 | Michielli .................... 141/172 |
| 4,628,974 | 12/1986 | Meyer ......................... 141/129 |
| 4,738,290 | 4/1988 | Ciekanski ..................... 141/82 |
| 4,762,483 | 8/1988 | Zevlakis . |
| 4,793,279 | 12/1988 | Grenier ..................... 141/104 X |
| 4,807,780 | 2/1989 | Parsons et al. ............. 141/174 X |
| 4,827,993 | 5/1989 | Ito et al. .................. 141/104 X |
| 4,942,910 | 7/1990 | Hamamura .................... 141/82 X |
| 4,944,337 | 7/1990 | Credle, Jr. et al. ............. 141/174 |
| 4,989,623 | 2/1991 | Hoffman et al. ............... 141/90 X |
| 5,000,345 | 3/1991 | Brogna et al. ............... 141/103 X |
| 5,055,408 | 10/1991 | Higo et al. ................. 141/130 X |

FOREIGN PATENT DOCUMENTS

2248050 4/1974 Germany .
574178 12/1945 United Kingdom .

*Primary Examiner*—Ernest G. Cusick
*Attorney, Agent, or Firm*—Hoffman, Wasson & Gitler

[57] ABSTRACT

An automatic dispenser for doughy food products, particularly for shop windows displaying ice cream products to be dispensed. The dispenser includes a taking unit which is movable with respect to ice cream containers present in the shop window. The taking unit dispenses a desired portion of ice cream and organizes the sorting, taking and dispensing of the desired portion.

46 Claims, 6 Drawing Sheets

AUTOMATIC DISPENSER FOR DOUGHY FOOD PRODUCTS

BACKGROUND OF THE INVENTION

The present invention refers to an automatic dispenser for doughy food products, particularly for shop windows exposing ice-cream.

At present the sale of ice-cream occurs in two fundamental ways: one of these foresees the preservation of the ice-cream in a packet corresponding to the single portion and the sale of such a packet to the customer requiring it. The other way foresees the preservation of ice-cream in little basins or other containers and the dispensing by the ice-cream man, with a little shovel, of a quantity corresponding to a portion, which is given to the customer generally in a cup, a cone or a wafer. A more precise determination and shape of the quantity of ice-cream corresponding to the single portion can be obtained by using particular shovels having a semi-sphere shaped head.

While the first way is suitable to an automatic distribution of the single packets of ice-cream through suitable apparatus, but requires the production and the packaging in the factory, the second way, which is suitable to the sale of the so called "handicraft" ice-cream or in any case of ice-cream packaged in multi-portion containers, cannot be automated and requires the direct presence of the ice-cream man.

Furthermore, due to the obvious need of having access from the outside to the basins of ice-cream, this second way implies: on one hand, the risks of a non perfect observance of the hygienic rules, which require that the product be dust-proof and germ-proof, and on the other hand, a high thermic dispersion which, besides implying high energy consumptions, also can cause a deterioration of the product, due to its possible preservation in conditions different from those optimal.

An automatic dispenser apparatus, or a dispenser apparatus which can be automated used to deliver ice-cream from multiportion packs is known. Such dispenser apparatus requires the use of a compressed gas or a pressure pump, having the double function of making soft the ice-cream and causing its coming out from a dispenser neck, and also requires that the ice-cream has a semifluid consistency, well different from that of the so called "handicraft" ice-cream.

U.S. Pat. No. 3,838,791 describes an automatic dispenser of spherical-shaped prepackaged ice-creams, inserted into a package inside which the scooped ice-creams are aligned. The packages are supported on an endless belt conveyor which disposes each package in front of an ejecting mechanism which gets out from it one-by-one the scooped ice-cream and discharges outwardly. This dispenser requires the use of prepackaged ice-creams and cannot be used with basins from which the single portions must be taken away.

U.S. Pat. No. 3,590,750 describes an automatic dispenser for ice-cream comprising a scoop mechanism supported on a structure which is solely vertically movable with respect to an underlying turntable. A plurality of mechanisms is provided to take ice-cream from a bulk ice-cream supply disposed on the turntable and to transport the scooped ice-cream to an empty cone placed on a cone support. This dispenser operates only with a rotating vessel and therefore doesn't allow any choice of the quantity of ice cream, it presents an unreliable operating due to the absence of means favoring the removal from the mechanisms taking it, and an uncertain hygiene due to the absence of any washing means.

U.S. Pat. No. 3,876,110 describes an automatic machine for dispensing ice-cream cones and comprising a plurality of storage tanks and extrusion tanks from which the ice-cream is discharged and cut off with wire loops and placed on a cone to be transferred outwardly.

An aim of the invention is to provide an automatic dispenser which allows the dispensing of a single portion from a handicraft ice-cream supply placed in a basin.

A further aim of the invention is to provide an automatic dispenser which allows for the selection of an ice-cream from a plurality of ice-cream basins housed within a cooled shop window, and which practically carries out the same operation carried manually out by the ice-cream man.

A further aim of the invention is to provide a dispenser which can be used with containers having different sizes.

A further aim of the invention is to provide an automatic dispenser, which doesn't impede the manual distribution from an ice-cream man.

A further aim of the invention is to provide an automatic dispenser which is reliable so as to ensure the removal of the ice-cream from the means dispensing it from the basin at any irrigation cycle.

These and further aims which will be apparent from the following description are attained according to the invention through an automatic dispenser for doughy food products, particularly for shop windows exposing ice-creams.

BRIEF DESCRIPTION OF THE DRAWINGS

The present invention is hereinafter further clarified with reference to the enclosed drawings in which.

DETAILED DESCRIPTION OF THE DRAWINGS

Figure 1:
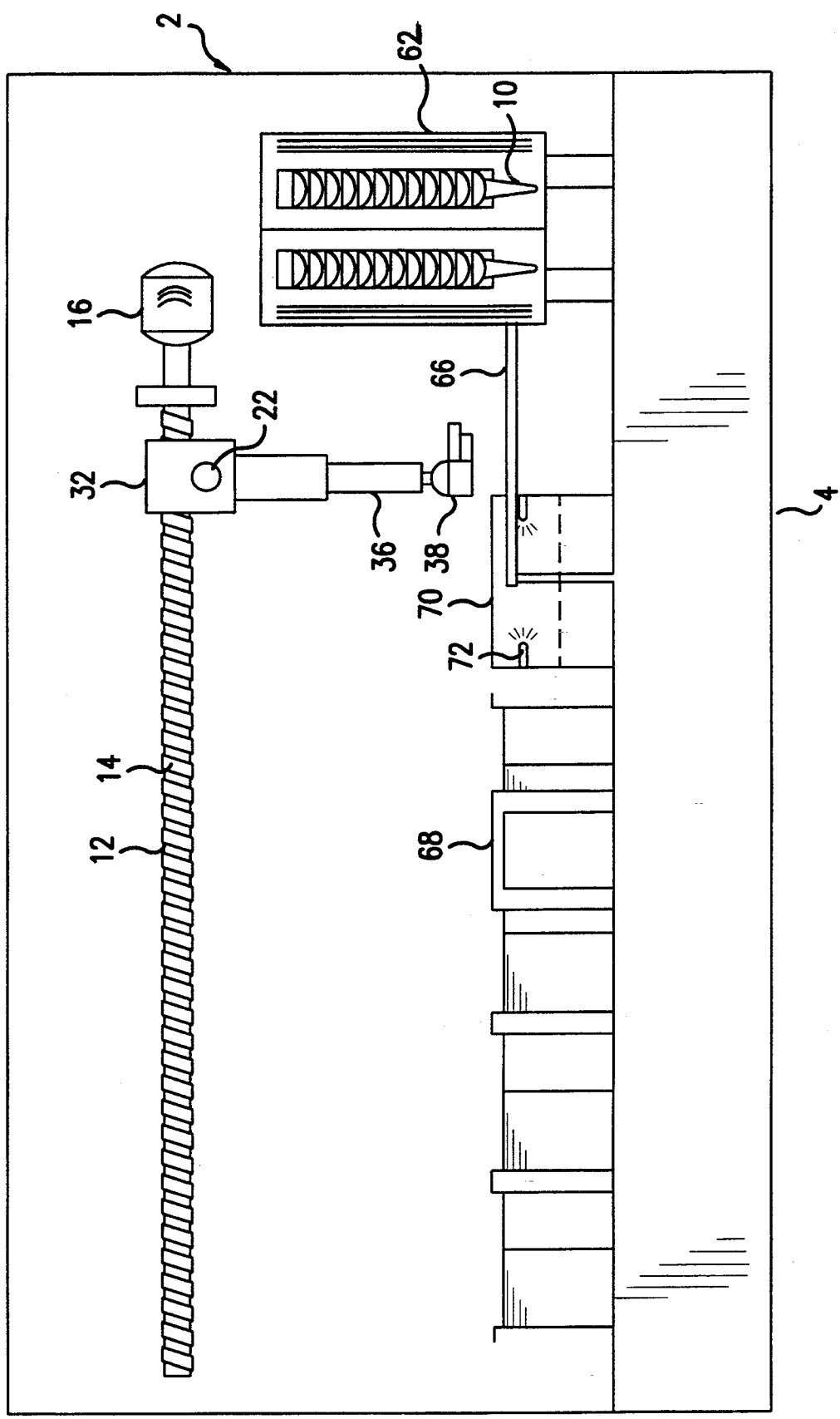
FIG. 1 schematically shows in side view an automatic dispenser for ice-creams according to the invention.

As it can be seen from the drawings, the dispenser apparatus according to the invention is placed in a substantially parallelepipedic refrigerant shop window 2, mounted on an underlying base 4 in which a refrigerant apparatus is housed, which keeps the temperature inside of the shop window 2 at conditions suitable to preserve an ice-cream product.

The shop window 2 is substantially divided in a lower zone housing little basins 8 arranged in one or more rows and containing the various types of ice-cream products and in an upper zone which is divided into an operating zone with a taking unit 6 of the ice-cream, into a parking area for stacks of cones 10 or cups, into a washing area for the taking unit 6 and into a dispenser area for the packaged ice-creams.

Close to the two upper longitudinal edges of the shop window 2 there is provided, near the operating zone of the taking unit 6, two guides 12 formed by two shafts provided with a helical groove 14. One of the two shafts 12 is rotated by an electric step-by-step motor 16 and the other shaft is coupled to the first shaft through a toothed belt link 18 to ensure their synchronism in rotation.

On said guides 12, corresponding carriages 20 slide, connected to each other through a further guide, even formed by a shaft 22 provided with a helical groove 24 and driven by another electric step-by-step motor 26. This transverse guide 22 is surrounded by an external tubular guide 28, provided with a rectilinear longitudinal groove 30, having the purpose, as it will be later clarified, of preventing the rotation of a transverse carriage 32, mounted on the shaft 22, and of allowing at the same time its displacement from one end to the other of the guide.

For this purpose the transverse carriage 32 is provided with a portion 34 projecting downwards and passing through the rectilinear groove 30 of said external tubular guide 28.

A taking and slicing member of the ice-cream to be dispensed is connected to the projecting portion 34. This member is supported by the transverse carriage 32 through a vertical support 36, which is telescopically extensible and may be controlled during its extension. At the lower end it is provided with a head, shown overall with 38. In the embodiment shown in FIG. 3, it is provided with a parallelepipedic square base body 40, upperly connecting with a substantial hemispheric portion 42. At its inside a hemispheric bowl 44 is placed, supported by a hollow rod 46 axially movable with respect to the vertical support 36 and coaxially housing at the inside a shaft 48, to the lower end of which a blade 50 is fixed which is curved according to the curvature of said hemispheric bowl.

To the side wall 52 of the parallelepipedic body 40, opposite to the parking area of the trays 8 of the ice-cream, a scraper is applied, substantially formed by a thin sheet 54, horizontally movable along the free edge of the body 40 and driven in this movement by an actuator 56, pneumatically operated, between a rest position, in which it sets free the edge of the body 40, and a work position, in which it completely closes the lower opening of the same body 40.

The parking zone of cones 10 or cups comprises a plurality of tubular containers 60, each housing a stack of cones, or cups or wafers. These tubular containers 60 are mounted on a rotating support 62, able to position the chosen stack to correspond with a taking unit. This is formed by a vise 64 mounted on an arm 66 movable between a taking position of the lowest cone 10 (or cup) of the stack, and a receiving position of the portion of ice-cream. Near this position a rotating box 68 is foreseen for transferring the packaged product outside the shop window 2. This box 68 has the function of preventing the direct connection between the inside and the outside of the shop window. This avoids any contamination of the products housed at the inside of the shop window and also avoids any thermic loss.

In the case where the cones or cups are replaced by wafers, near the arm 66, a second arm (not shown) is foreseen, also provided with a vise, which has the function of taking from the same stack another wafer and to place it with a slight pressure on the ice-cream which has previously been placed on the lower wafer held by the vise 64.

The box 68 is placed in the operating zone of the taking unit 6, and a washing station is foreseen in a zone different from this. It is substantially formed by a small basin 70, provided with nozzles 72, spraying a washing liquid, and with a drain, for the liquid which washed the taking unit.

All the motors and actuators which actuate the various parts are independently driven and controlled by a microprocessor, which co-ordinates their operation according to a prefixed operating program, which will be described herebelow.

To better understand the operation of the dispenser according to the invention, it is preferable to start, for simplicity reasons, with reference to a rest condition in which:

the taking unit 6 is in a prefixed raised stand-by position, in correspondence to the underlying washing area, with the hemispherical bowl 44 adhering to the hemispheric portion 42 and with the scraper 54 in rest condition, the arm 66 of the vise 64 keeps it in the taking station, with an empty cone between its jaws.

At this time, if a customer wishes an ice-cream, he puts the corresponding amount in a traditional collection and counting device and from a suitable keyboard gives the necessary information corresponding to the desired ice-cream.

These instructions start the automatic taking cycle, which foresees, first of all, a command to the taking unit to take away a portion of ice-cream. For this purpose the memory of the system, which had memorized the co-ordinates of the last taking of such a type of ice-cream, orders the taking unit 6 to displace one step from the previous one, to allow it to take an adjacent portion of ice-cream. Firstly, the motor 16 is energized, which causes rotation of the two horizontal grooved shafts 12 and then advancement of the corresponding longitudinal carriages 20 until the head 38 is positioned on a transverse zone of the ice-cream, containing the portion to be taken; then the motor 16 is stopped and the motor 26 is energized, which causes advancement of the transverse carriage 32 along said transverse zone of ice-cream until the taking unit 6 is positioned over the portion to be taken; lastly elongation of the telescopic support 36 is ordered, which makes the head 38 descend until its edge plunges completely into the ice-cream to separate the desired portion.

At this time, the actuator 56 is driven, which actuates the scraper 54, thus closing the head 38; then axial movement is given to the rod 46, thus causing the descent of the hemispheric bowl 44 to press the ice-cream already contained within the head 38 between the hemispheric bowl 44 and the scraper 54, thus giving it the traditional hemispheric shape.

At the end of this phase the telescopic support 36 is withdrawn and then a command is given to the motors 16 and 26, which drives the longitudinal 20 and transverse 32 carriages to move the head 38 towards the dispensing station, where a further order of elongation to the telescopic support 36 causes the descent of the head 38 above the cone 10 in a stand-by position in the dispensing station, where it was brought by the vise 64.

When the head 38 has reached the dispensing station, the actuator 56 is driven, which brings the scraper 54 in a condition to open the bottom of the head, so that a subsequent rotation order to the curved blade 50 causes the separation of the ice-cream from the hemispheric bowl 44 and its fall on the cone 10.

It is also foreseen that the removal of the portion of ice-cream from the bowl 44 is caused, rather than by the blade 50, from a single or a plurality of jets of air, preferably heated, or from a heating element, housed in the bowl and suitable to cause the localized fusion of the portion of ice-cream in touch with said bowl and the subsequent fall due to gravity of the portion onto cone 10.

When this dispensing phase is ended, suitable orders are given to the actuators of the head 38 to transfer the head 38 to the washing station, and an order is given to the vise 64 to transfer the cone 10 into the box 68, whose subsequent rotation of 180° allows the customer standing at the outside of the shop window to take the packaged ice-cream. In the meantime a jet of liquid causes the washing of the head 38 to prepare the dispenser for a subsequent operating cycle, which starts with the new request by the customer.

Figure 2:
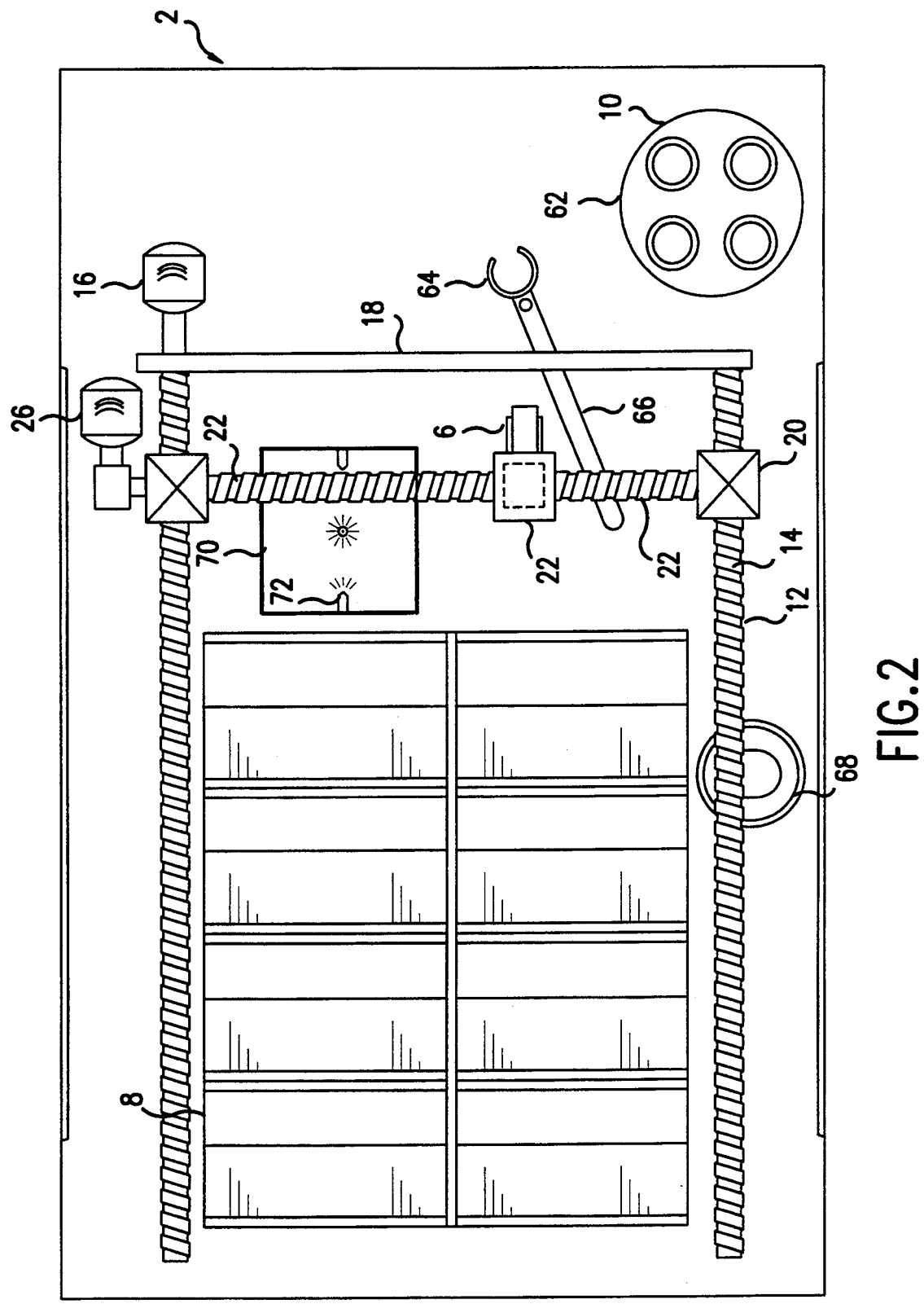
FIG. 2 shows it in plan view.
Figure 4:
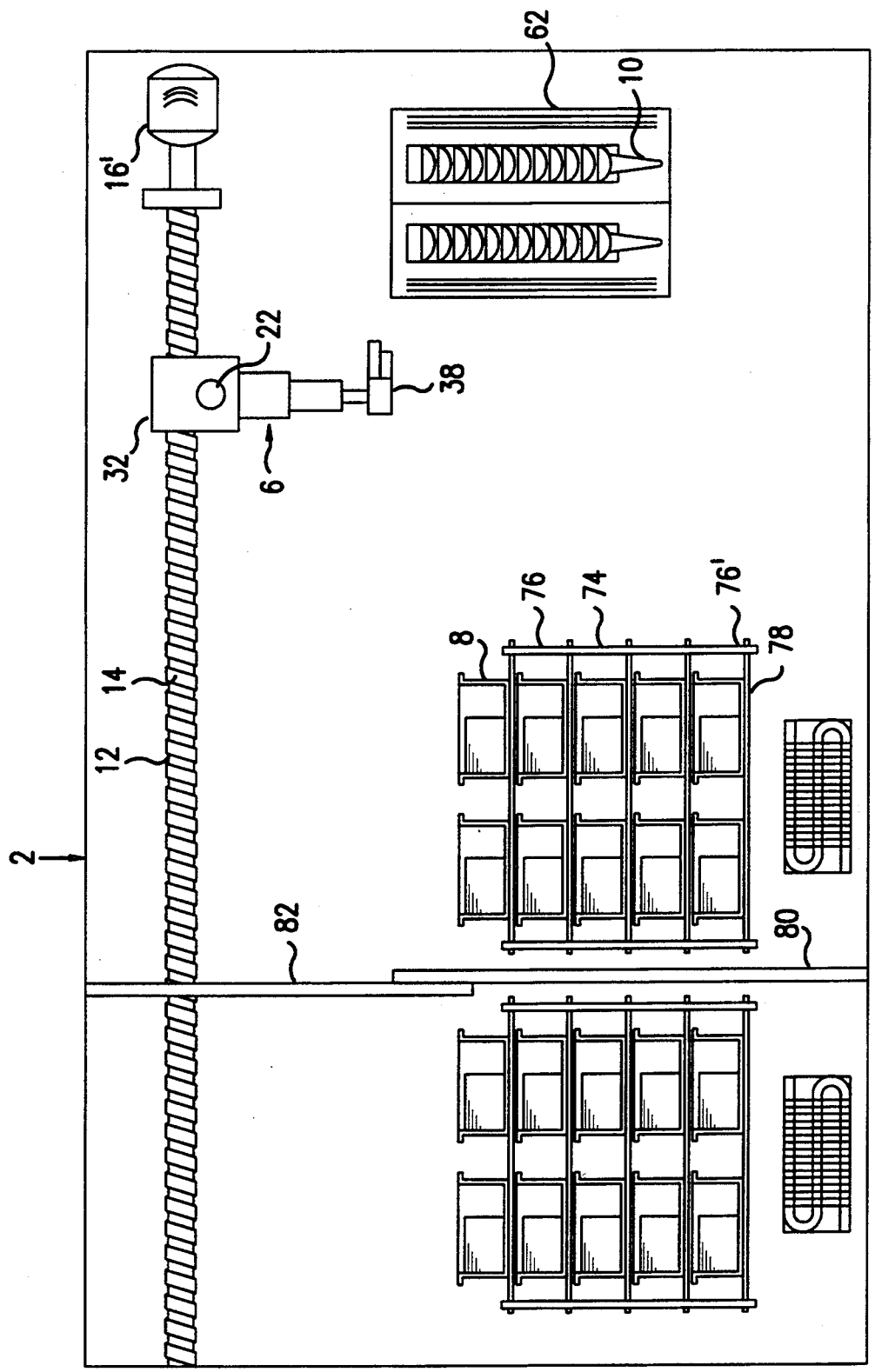
Figure 5:
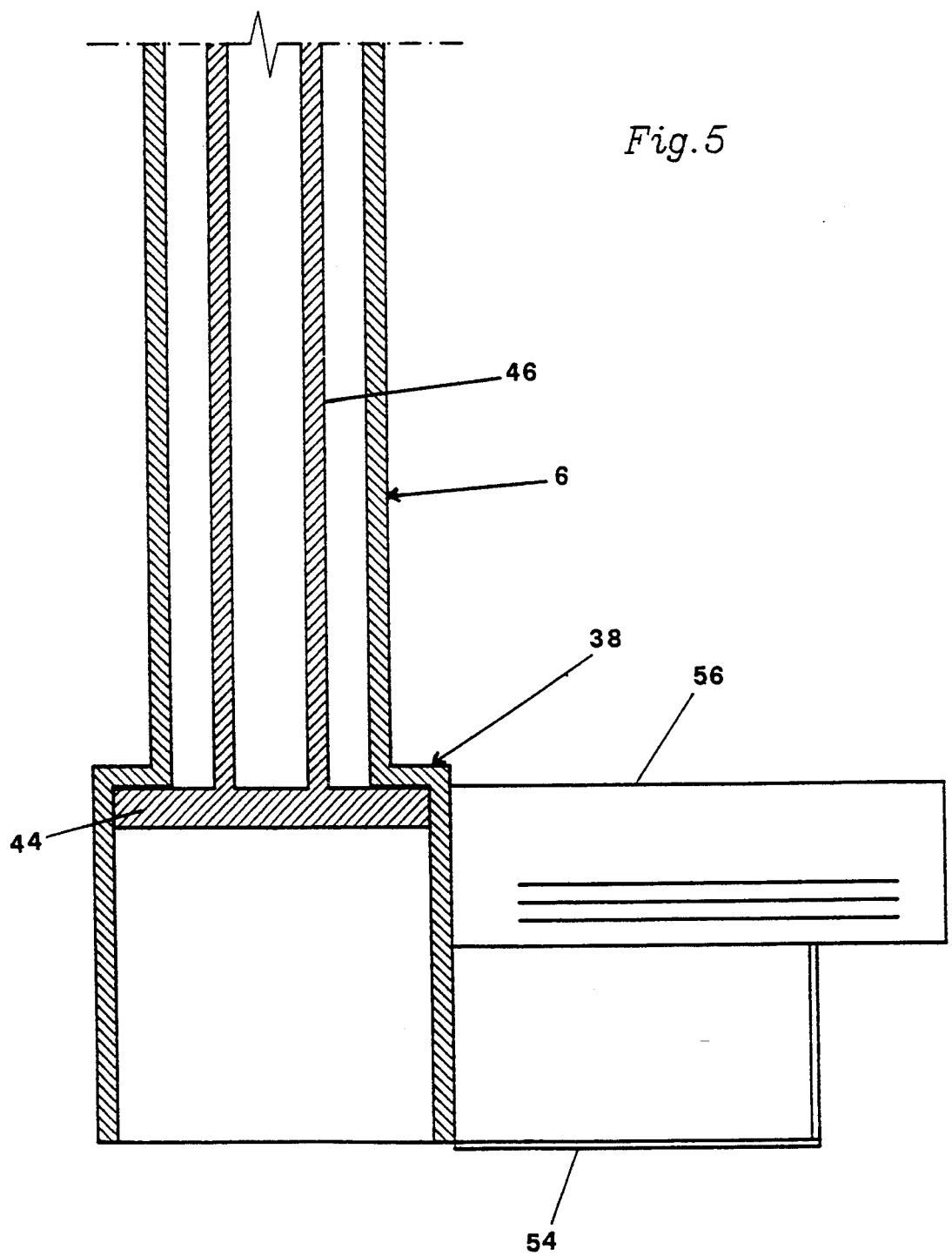
FIG. 5 shows in vertical section view the enlarged particular of the taking unit, used in the embodiment according to FIG. 4.

To allow for correct operation of the taking unit 6 it is foreseen that the vessels are not completely filled with ice-cream, but are without a portion, visible in FIGS. 1, 2 and 4 to allow the insertion into the vessel of the taking unit, which unavoidably presents a certain encumbrance due to the presence of the scraper 54 and actuator 56.

The taking unit has been described in the singular even though for some requirements a multiple taking unit is foreseen, formed by more taking members, which have different capacities and may be chosen according to customer's specific requirements. In addition, several taking heads can be provided all with different capacities mounted on a sole support structure in a sunburst fashion.

Furthermore the above described example foresees a completely automatic operation, controlled by a microprocessor after introduction into the collection device the amount corresponding to a desired ice-cream. Dispensing can also be provided by a keyboard, through which the ice-cream man can give the same commands with a sequence, in a non-automated, but manual fashion.

In the embodiment shown in FIG. 4, shop window 2 houses at its inside a pair of continuous vertical conveyors, each comprising a pair of chains 74 guided by pinions 76, 76' and a plurality of hanging shelves 78 supporting trays or basins containing the ice-cream. At least a pinion 76' of each chain 74 is rotated by a step-by-step motor (not shown).

The two continuous vertical conveyors are separated by a screen 80, which doesn't extend the whole height of the shop window 2, but ends at a certain height from the upper cover to not impede the movements of the taking unit 6, at least when the telescopic support 36 is in its retracted condition. In the drawings a taking unit 6 is shown similar to the previous one both from the shape point of view and its operating and movement point of view. However, in the drawings the taking unit 6 has been shown with the upper part planar, instead of hemispheric, in order to evidentiate a possible different shape, which can be used also in the previous embodiment.

A wall 82 is connected to the screen 80 vertically movable on command of an actuator (not shown) to cause the complete closure of the two areas, housing the two distinct conveyors and therefore to allow the maintenance in such areas of different climatic conditions.

The movements of this wall 82 according to the displacements of the taking unit 6 is controlled by the same microprocessor.

Also in this case, a parking area is foreseen for the cones 10, near an end of travel position of the taking unit 6, as well as a washing area of the taking unit and a dispensing area of the packaged ice-creams. Since these are technical solutions substantially similar to those above described, for simplicity reasons they are neither shown, nor further described.

The dispenser according to this second embodiment operates as follows.

Depending on the chosen ice-cream, an order given by the microprocessor to the motor driving the pinions 76', actuates the chains 74 until the hanging shelf 78, on which the basin 8 containing the chosen ice-cream is placed, reaches the highest point of its run and here it stops awaiting that the head 38 takes away from the basin a portion of ice-cream to be put on the cone 10 before being dispensed to the outside.

It may be noted that if the scraper 54 is actuated when the plane ejector 44 has reached its lower end of travel position, it acts as the blade 50, which can be missing.

Figure 3:
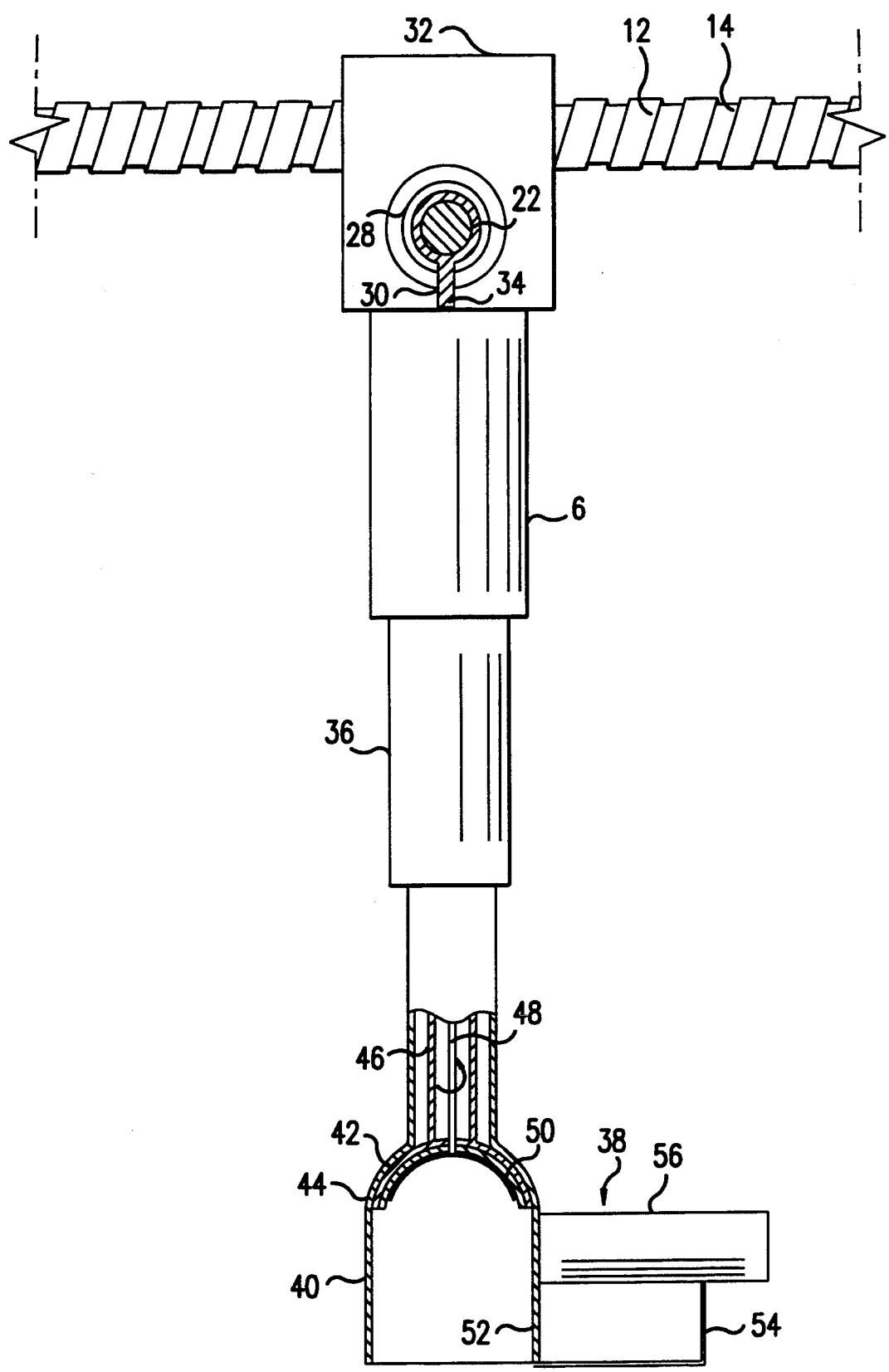
FIG. 3 shows in vertical section the enlarged particular of the taking unit, FIG. 4 schematically shows in side view an automatic dispenser for ice-cream in a different embodiment.
Figure 6:
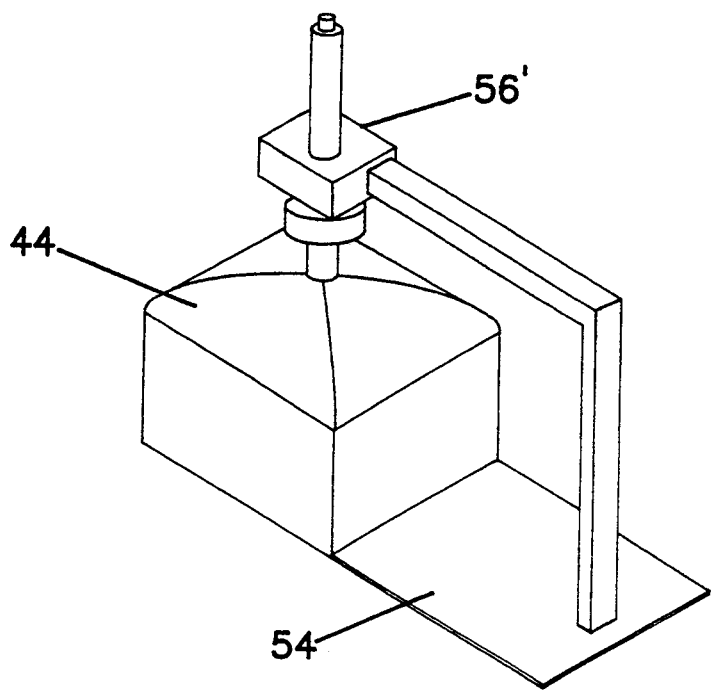
FIG. 6 shows in perspective view the enlarged particular of the taking unit in a different embodiment.
Figure 7:
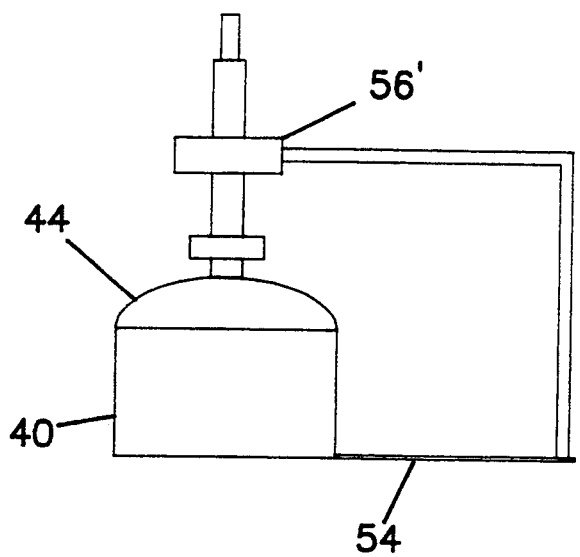
FIG. 7 shows it in vertical section.
Figure 8:
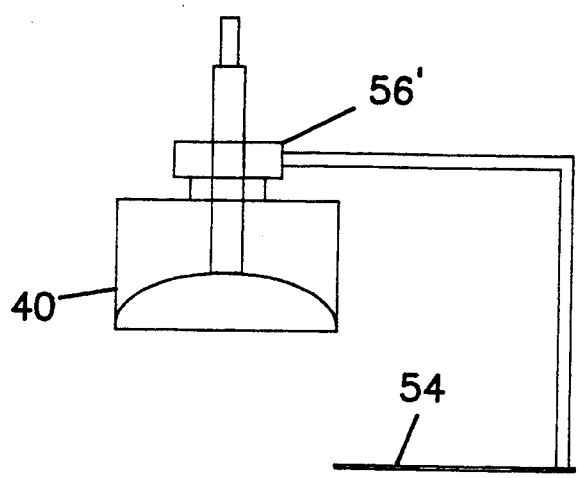
FIG. 8 shows it in the same view as FIG. 7 in different operating conditions.

The embodiment shown in FIGS. 6, 7 and 8 corresponds to the embodiment shown in FIG. 3 apart from the shape of the actuator 56' of the scraper 58. More precisely, this embodiment foresees that the upper bowl 44 of the taking head 40 is axially movable with respect to the side walls 40 of the same head, but unlike this, it foresees that on the telescopic support an electronic motor 56' is applied which, through a rack, controls the movements of the blade 54 in the two ways.

What is claimed is:

1. An automatic dispenser, for doughy food products contained in at least one vessel, comprising:
   a taking unit which is movable with respect to said vessel having means for taking away a desired portion of said doughy food product from said at least one vessel and means for dispensing said desired portion of said doughy food product, said taking unit further comprises at least one hollow shaped head mounted on a structure movable in three orthogonal directions with respect to said vessel, said at least one hollow shaped head has an open end facing said vessel and a closed opposite end to allow for said desired portion to be taken away; and means for removal of said desired portion of doughy food product from said head,
   wherein said head has a quadrangular base having an upper and lower part and said upper part of said base is connected to a substantially hemispheric portion.

2. An automatic dispenser for doughy food products, as claimed in claim 1, wherein said vessels are housed in at least two different climate controlled environments.

3. An automatic dispenser for doughy food products, as claimed in claim 2, wherein said environments are separated by a screen and connected by a passage to allow said taking unit to move from one environment to another.

4. An automatic dispenser for doughy food products, as claimed in claim 1, wherein said head has a dome shaped upper portion.

5. An automatic dispenser for doughy food products, as claimed in claim 1, wherein said head is cylindrical.

6. An automatic dispenser for doughy food products, as claimed in claim 1, wherein said means for removal of said desired portion of doughy food products moves between a rest position inside said head delimitating a space for said desired portion of doughy food product and an ejection position for removal of said portion.

7. An automatic dispenser for doughy food products, as claimed in claim 1, wherein said means for removal of said desired portion of doughy food product is a blade.

8. An automatic dispenser for doughy food products, as claimed in claim 7, wherein said means for removal of said doughy food product is a rotating blade housed at an upper end of said head of said taking unit.

9. An automatic dispenser for doughy food products, as claimed in claim 1, wherein said head of said taking unit has an upper section shape of a hemispheric bowl and a lower section shape of a parallelepipedic square without a base, said taking unit further comprises a hemispheric bowl housed in said upper section of said head and oxially movable with respect to said head, and a rotating curved blade housed inside said bowl.

10. An automatic dispenser for doughy food products, as claimed in claim 1, wherein said head of said taking unit has an upper section shape of a cylinder and a lower section shape of a parallelepipedic square without base, said taking unit further comprises a discoidal ejector houser in said upper section and virtually movable with respect to said head and a rotating curved blade housed inside said ejector.

11. An automatic dispenser for doughy food products, as claimed in claim 1, wherein said head further comprises a scraper connected to said head.

12. An automatic dispenser for doughy food products, as claimed in claim 1, wherein said taking unit has a support structure mounted on a first carriage movable along a transverse guide supported at its ends by two longitudinal carriages movable along two longitudinal guides; and means for moving said transverse carriage and said longitudinal carriages along said transverse guide and longitudinal guides.

13. An automatic dispenser for doughy food products, as claimed in claim 1, further comprising a means for separating and transferring stacked cones or cups from a storage zone for said stacked cones or cups to a dispensing zone for said portion of doughy food product.

14. An automatic dispenser for doughy food products, as claimed in claim 13, wherein said means for separating and transferring stacked cones or cups comprises a vise supported by an arm.

15. An automatic dispenser for doughy food products, as claimed in claim 1, further comprising a two position rotating box located near a delivery position for said portion of said doughy food product when said dispenser is placed in a shop window to allow for communication between said dispenser and a recipient of said portion.

16. An automatic dispenser for doughy food products, as claimed in claim 1, further comprising a rest station for said taking unit having means for washing said unit.

17. An automatic dispenser, for doughy food products contained in at least one vessel, comprising:
a taking unit which is movable with respect to said vessel having means for taking away a desired portion of said doughy food product from said at least one vessel and means for dispensing said desired portion of said doughy food product, said taking unit further comprises at least one hollow shaped head mounted on a structure movable in three orthogonal directions with respect to said vessel, said at least one hollow shaped head has an open end facing said vessel and a closed opposite end to allow for said desired portion to be taken away; and means for removal of said desired portion of doughy food product from said head, wherein said head of said taking unit has an upper section shape of a hemispheric bowl and a lower section shape of a parallelepipedic square without a base, said taking unit further comprises a hemispheric bowl housed in said upper section of said head and axially movable with respect to said head, and a rotating curved blade housed inside said bowl.

18. An automatic dispenser for doughy food products, as claimed in claim 17, wherein said vessels are housed in at least two different climate controlled environments.

19. An automatic dispenser for doughy food products, as claimed in claim 18, wherein said environments are separated by a screen and connected by a passage to allow said taking unit to move from one environment to another.

20. An automatic dispenser for doughy food products, as claimed in claim 17, wherein said head has a quadrangular base.

21. An automatic dispenser for doughy food products, as claimed in claim 20, wherein said quadrangular base of said head has an upper and lower part and said upper part of said base is connected to a substantially hemispheric portion.

22. An automatic dispenser for doughy food products, as claimed in claim 17, wherein said means for removal of said desired portion of doughy food products moves between a rest position inside said head delimitating a space for said desired portion of doughy food product and an ejection position for removal of said portion.

23. An automatic dispenser for doughy food products, as claimed in claim 17, wherein said means for removal of said desired portion of doughy food product is a blade.

24. An automatic dispenser for doughy food products, as claimed in claim 23, wherein said means for removal of said doughy food product is a rotating blade housed at an upper end of said head of said taking unit.

25. An automatic dispenser for doughy food products, as claimed in claim 17, wherein said head further comprises a scraper connected to said head.

26. An automatic dispenser for doughy food products, as claimed in claim 17, wherein said taking unit has a support structure mounted on a first carriage movable along a transverse guide supported at its ends by two longitudinal carriages movable along two longitudinal guides; and means for moving said transverse carriage and said longitudinal carriages along said transverse guide and longitudinal guides.

27. An automatic dispenser for doughy food products, as claimed in claim 17, further comprising a means for separating and transferring stacked cones or cups from a storage zone for said stacked cones or cups to a dispensing zone for said portion of doughy food product.

28. An automatic dispenser for doughy food products, as claimed in claim 17, wherein said means for separating and transferring stacked cones or cups comprises a vise supported by an arm.

29. An automatic dispenser for doughy food products, as claimed in claim 17, further comprising a two position rotating box located near a delivery position for said portion of said doughy food product when said dispenser is placed in a shop window to allow for communication between said dispenser and a recipient of said portion.

30. An automatic dispenser for doughy food products, as claimed in claim 17, further comprising a rest station for said taking unit having means for washing said unit.

31. An automatic dispenser, for doughy food products contained in at least one vessel, comprising:
a taking unit which is movable with respect to said vessel having means for taking away a desired portion said doughy food product from said at least one vessel and means for dispensing said desired portion of said doughy food product, said taking unit further comprises at least one hollow shaped head mounted on a structure movable in three orthogonal directions with respect to said vessel, said at least one hollow shaped head has an open end facing said vessel and a closed opposite end to allow for said desired portion to be taken away; and means for removal of said desired portion of doughy food product from said head, wherein said head of said taking unit has an upper section shape of a cylinder and a lower section shape of a parallelepipedic square without base, said taking unit further comprises a discoidal ejector houser in said upper section and virtually movable with respect to said head and a rotating curved blade housed inside said ejector.

32. An automatic dispenser for doughy food products, as claimed in claim 31, wherein said vessels are housed in at least two different climate controlled environments.

33. An automatic dispenser for doughy food products, as claimed in claim 31, wherein said environments are separated by a screen and connected by a passage to allow said taking unit to move from one environment to another.

34. An automatic dispenser for doughy food products, as claimed in claim 31, wherein said head has a quadrangular base.

35. An automatic dispenser for doughy food products, as claimed in claim 31, wherein said means for removal of said desired portion of doughy food products moves between a rest position inside said head delimitating a space for said desired portion of doughy food product and an ejection position for removal of said portion.

36. An automatic dispenser for doughy food products, as claimed in claim 31, wherein said means for removal of said desired portion of doughy food product is a blade.

37. An automatic dispenser for doughy food products, as claimed in claim 36, wherein said means for removal of said doughy food product is a rotating blade housed at an upper end of said head of said taking unit.

38. An automatic dispenser for doughy food products, as claimed in claim 31, wherein said head further comprises a scraper connected to said head.

39. An automatic dispenser for doughy food products, as claimed in claim 31, wherein said taking unit has a support structure mounted on a first carriage movable along a transverse guide supported at its ends by two longitudinal carriages movable along two longitudinal guides; and means for moving said transverse carriage and said longitudinal carriages along said transverse guide and longitudinal guides.

40. An automatic dispenser for doughy food products, as claimed in claim 31, further comprising a means for separating and transferring stacked cones or cups from a storage zone for said stacked cones or cups to a dispensing zone for said portion of doughy food product.

41. An automatic dispenser for doughy food products, as claimed in claim 40, wherein said means for separating and transferring stacked cones or cups comprises a vise supported by an arm.

42. An automatic dispenser for doughy food products, as claimed in claim 31, further comprising a two position rotating box located near a delivery position for said portion of said doughy food product when said dispenser is placed in a shop window to allow for communication between said dispenser and a recipient of said portion.

43. An automatic dispenser for doughy food products, as claimed in claim 31, further comprising a rest station for said taking unit having means for washing said unit.

44. An automatic dispenser, for doughy food products contained in at least one vessel, comprising:
a taking unit which is movable with respect to said vessel having means for taking away a desired portion of said doughy food product from said at least one vessel and means for dispensing said desired portion of said doughy food product, said taking unit further comprises at least one hollow shaped head mounted on a structure movable in three orthogonal directions with respect to said vessel, said at least one hollow shaped head has an open end facing said vessel and a closed opposite end to allow for said desired portion to be taken away; and means for removal of said desired portion of doughy food product from said head, wherein said means for removal of said doughy food product is a rotating blade housed at an upper end of said head of said taking unit.

45. An automatic dispenser, for doughy food products contained in at least one vessel, comprising:
a taking unit which is movable with respect to said vessel having means for taking away a desired portion of said doughy food product from said at least one vessel and means for dispensing said desired portion of said doughy food product, said taking unit further comprises at least on hollow shaped head mounted on a structure movable in three orthogonal directions with respect to said vessel, said at least one hollow shaped head has an open end facing said vessel and a closed opposite end to allow for said desired portion to be taken away; and means for removal of said desired portion of doughy food product from said head, wherein said vessels are housed in at least two different climate controlled environments.

46. An automatic dispenser for doughy food products, as claimed in claim 44, wherein said environments are separated by a screen and connected by a passage to allow said taking unit to move from one environment to another.

* * * * *